Feb. 26, 1946.  G. W. COOK  2,395,534
CHUCK
Filed May 24, 1944
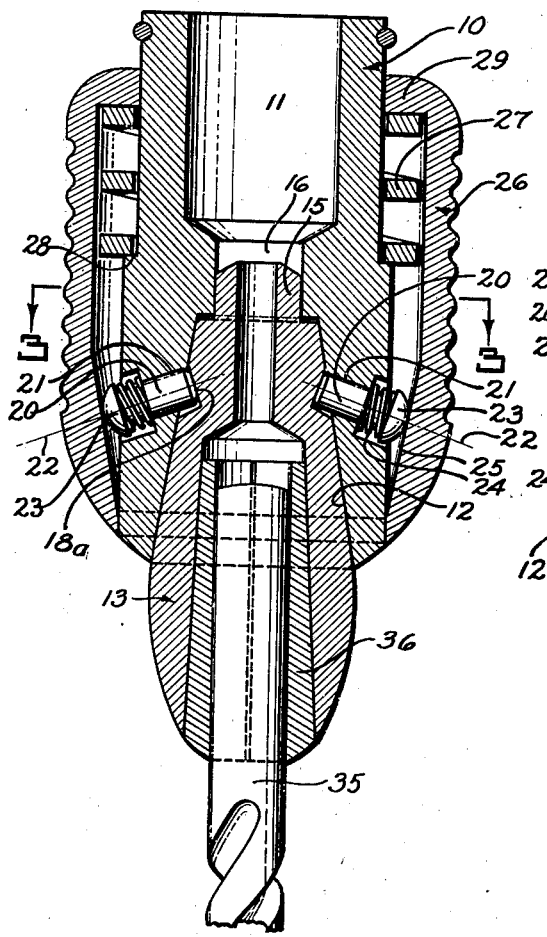
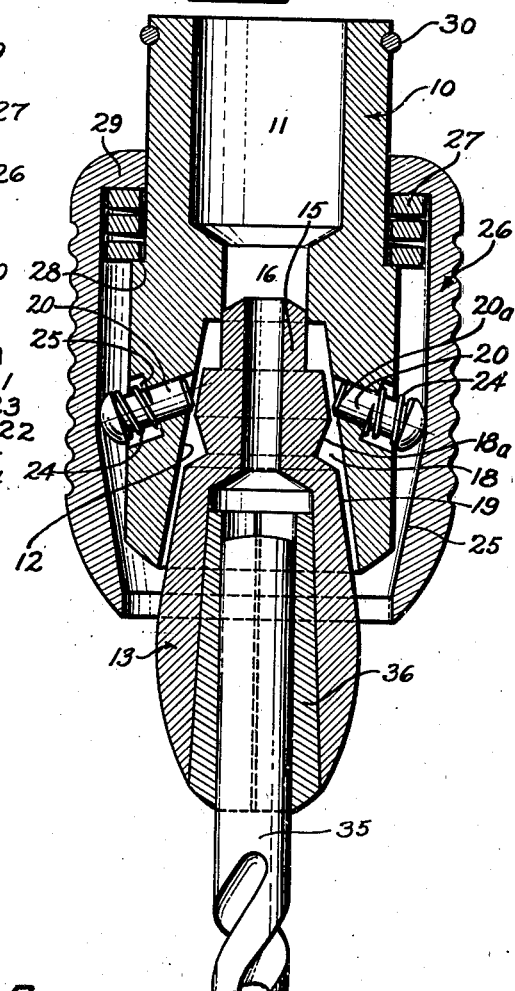
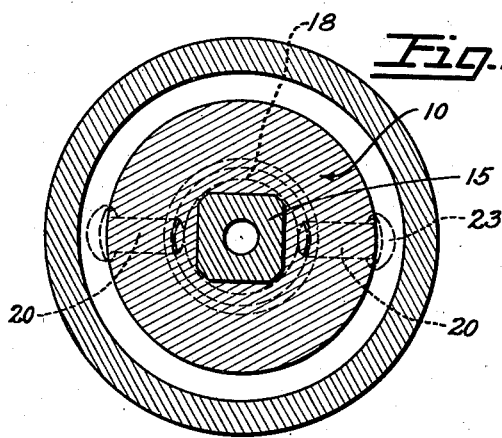
Inventor
George W. Cook
By
Blakelow & Seantlebury
Attorney Patented Feb. 26, 1946

2,395,534

UNITED STATES PATENT OFFICE 2,395,534

CHUCK

George W. Cook, Los Angeles, Calif., assignor of ninety per cent to Lloyd W. Miller, Glendale, Calif.

Application May 24, 1944, Serial No. 537,041

2 Claims. (Cl. 279—82)

My present invention has to do with chucks of the type known as quick-change chucks. The general purpose of the invention is to provide an improved chuck of the quick change type which is simple in construction and operation and, particularly, which holds the tool adapter or collet firmly and accurately in its operative position and in which the release of the adapter and the tool is free and instantaneous.

The invention will be more readily understood from the following detailed description of an illustrative design embodying my improvements, reference being had to the accompanying drawing in which, Fig. 1 is a longitudinal central section showing the chuck in its operative position with the tool inserted;

Fig. 2 is a similar section showing the tool released, and

Fig. 3 is a cross section taken on line 3—3 of Fig. 1.

In the drawing numeral 10 designates a chuck body which may be mounted on the spindle of any machine tool, such as the spindle of a drill press; bore 11, or any other attachment means, being designed suitably for attachment to the spindle. Assuming that the chuck body is mounted on the lower end of a drill press spindle, the parts will be described as if in vertical position. The lower end of chuck body 10 is provided with a downwardly opening tapered and preferably conical socket 12, preferably of a sufficiently large angle of taper that the similarly tapered adapter 13 will not be frictionally seized in the tapered bore. Gripping engagement between adapter 13 and tapered bore 12 is not depended upon for the rotative driving of the adapter and the tool; it is rather desired that the conical engagement be freely releasable so that the adapter and tool, when released, will immediately drop out of the conical bore. Consequently, a rotative driving connection is provided in the form of non-circular parts; for instance, a square driving lug 15 on the upper end of adapter 13 enters a similarly square driving bore 16 in body 10 at the upper end of tapered bore 12. Any other suitable driving engagement may be used; for instance the tapered bore and adapter could be non-circular (e. g. square) in cross-section.

A circular groove 18 is formed in the conical surface 19 of adapter 13, the bottom face 18a of the groove being conical in form, tapering downwardly, and the conical angle being preferably greater than the conical angle of bore 12 and adapter surface 19. When the adapter is inserted, as shown in Fig. 1, surface 18a is engaged by the flat ends of pins 20 which are slidably mounted in body 10 in bores 21 on upwardly and inwardly inclined axes 22 which are at right angles to the conical groove face 18a. As shown in the drawing, merely for convenience of illustration, two oppositely disposed pins are illustrated. Three, symmetrically arranged about the axis, are preferred; and generally speaking, while a single pin will perform the functions which are here described, a plurality in symmetric arrangement is preferred. Pins 20 have heads 23 at their outer ends, and light coil springs 24 are confined between heads 23 and recessed shoulders 25 in body 10. Springs 24 tend at all times to move pins 20 outwardly, from the position of Fig. 1 to the position of Fig. 2, and thus to disengage the inner ends of the pins from conical surface 18a and to allow adapter 13 to drop freely out of the chuck body.

Locking pins 20 are forced inwardly to the position of Fig. 1 by the action of internal conical surface 25 which forms the lower part of the interior bore of an external operating member 26, generally cylindric in form. Member 26 is urged upwardly, and normally held in the upper position shown in Fig. 1, by a heavy spring 27 which is confined between body shoulder 28 and the upper shoulder 29 on member 26. The ring shown at 30 at the upper end of the body merely typifies some means of limiting the upward movement of 26 when that member is allowed to move upward and no adapter 13 is present in the chuck to limit the inward movements of pins 20.

The tool which is held in adapter 13 may be a tool of any character, here shown as a twist drill 35; and the tool may be mounted in the adapter by any suitable means, here shown as a split tapered sleeve 36. Tools of different sizes may be mounted in adapters of standardized size by using sleeves 36 of proper internal dimensions. Although I prefer to use the described arrangement, embodying an adapter which is a piece separate from the tool itself and adapted to take tools of various sizes, it will be understood that the adapter may be a part of the tool itself.

When it is desired to insert an adapter and its tool into the chuck, external sleeve 26 is pulled down to the position of Fig. 2. When that is done, springs 24 act to move pins 20 out to the positions shown in that figure, so that the pins do not have to be moved outwardly by the subsequent insertion of the adapter. The adapter is then inserted to the position shown in Fig. 1, and, upon subsequent release of outer sleeve 26, spring 27 forces 26 up to the position of Fig. 1 and forces pins 20 inwardly and upwardly with considerable pressure against the downwardly tapering face 18a. Due to the angles at which pins 20 are placed, and the angle of face 18a, the inward force exerted through the pins along their inclined longitudinal axes has an upwardly directed component which forces the adapter upwardly and thus presses its conical face 19 upwardly into snug close engagement with conical bore 12. And in this connection, the fact that the downwardly tapering angle of seat surface 18a is greater than the upwardly tapering angle of bore 12 and adapter surface 19, is of some importance; the pressure which is exerted axially through the pins not only has an upward component with reference to the vertical axis of the adapter, but also has an upward component with reference to the opposite wall of tapered bore 12. Thus, when the parts are in the position shown in Fig. 1, the adapter is held tightly up into its conical seat and the tool 35 is thus rigidly and accurately held in concentric alinement with the chuck body and with the spindle on which it is mounted. It is further to be noted that when the parts are in the position of Fig. 1, any force which tends to move the adapter and tool downwardly, cannot move the actuator sleeve 26 downwardly to release the adapter from the chuck. That self locking feature is due to the fact that the semi-taper angle of conical surface 25 (the angle between the central axis and an element of that conical surface) is less than, rather than more than, the complement of the acute angle between the central axis and the axis 22 of a pin 20. Outward movement of pin 20 on its axis 22 tends to move actuator sleeve up, rather than down.

To release the adapter with its tool, it is only necessary to pull downwardly on the external operating sleeve 26. Immediately that sleeve is moved to the position in Fig. 2, springs 24 act to retract locking pins 20 so that the adapter and tool then fall freely out of the chuck. As soon as the adapter has fallen to about the position of Fig. 2, operating sleeve 26 may be released if desired, and the operator may then catch adapter 13 in the same hand which he has used for pulling sleeve 26 down. In the position of the parts shown in Fig. 2, if sleeve 26 is then released, the subsequent inward movements of pins 20 will cause the bevels 20a at their inner ends to engage the conical adapter surface 19 above the seat surface 18a; and the inwardly pressed movements of the pins will thus tend to force the adapter out rather than to retain it in the chuck. In any case, and regardless of how the operation is performed, it is to be noted that when external operating sleeve 26 is lowered, locking pins 20 are moved out by their springs 24 and do not have to be moved out by exerting a downward pull on the adapter. This feature is of some importance in making quick changes, as there are thus no parts of the device which are liable to stick and require the application of manual force to remove the adapter and tool.

So far as the rotary driving connection between chuck and adapter is concerned, the adapter may be inserted in any one of several different positions. With a square driving lug, that number is four. To facilitate that indifferent insertion of the adapter, the easiest manner of forming a number of recesses in the adapter face for engagement by a pin 20 or by a number of pins, is to form a circular groove as shown. Functionally, however, the circular groove may be considered as if it were a number of pin engaging recesses.

In addition to the advantageous features previously noted, my chuck also has the advantage of being simple and easy of construction as well as of operation. It is especially adapted, although of course not limited, to being made in very small sizes and for use on portable power tools where lightness, simplicity and ease of operation are especially desirable.

I claim:

1. In a quick-change chuck, the combination of a chuck body having an adapter receiving bore which tapers inwardly from the outer end of the body, a tapered adapter receivable in the bore, a recessed locking face in the tapering surface of the adapter, said face tapering longitudinally of the adapter in a direction opposite to the taper of the adapter surface, a locking pin mounted in the chuck body to slidingly project its inner end into the tapered bore and to engage the recessed locking face of the adapter, the axis of sliding movement of the pin inclining toward the central body axis and toward the inner end of the body, the outer end of the pin projecting beyond the outer surface of the body, an outer operating sleeve slidable longitudinally on the body and having at its outer end an internal bore which tapers toward the outer end of the sleeve, said tapered bore adapted to engage the projecting end of the pin so as to force the pin inwardly in the body by virtue of movement of the operating sleeve toward the inner end of the body and so as to release the pin for outward movement by virtue of movement of the sleeve toward the outer end of the body, and a spring acting between the body and the sleeve tending to move the sleeve toward the inner end of the body.

2. In a quick-change chuck, the combination of a chuck body having an adapter receiving bore which tapers inwardly from the outer end of the body, a tapered adapter receivable in the bore, a recessed locking face in the tapering surface of the adapter, said face tapering longitudinally of the adapter in a direction opposite to the taper of the adapter surface, a locking pin mounted in the chuck body to slidingly project its inner end into the tapered bore and to engage the recessed locking face of the adapter, the axis of sliding movement of the pin inclining toward the central body axis and toward the inner end of the body, the outer end of the pin projecting beyond the outer surface of the body, an outer operating sleeve slidable longitudinally on the body and having at its outer end an internal bore which tapers toward the outer end of the sleeve, said tapered bore adapted to engage the projecting end of the pin so as to force the pin inwardly in the body by virtue of movement of the operating sleeve toward the inner end of the body and so as to release the pin for outward movement by virtue of movement of the sleeve toward the outer end of the body, and a spring acting between the body and the sleeve tending to move the sleeve toward the inner end of the body, the half-taper angle of the bore in the sleeve being less than the complement of the acute angle between the pin axis and the central axis of the body, so that outward movement of the pin tends to move the sleeve toward the inner end of the body.

GEORGE W. COOK.